United States Patent [19]

Somerville et al.

[11] Patent Number: 4,864,509
[45] Date of Patent: Sep. 5, 1989

[54] METHOD AND RELATED APPARATUS FOR CONTROLLING THE OPERATION OF A PRESS BRAKE

[75] Inventors: Gordon R. Somerville; D. Bruce Thomas, both of Seattle, Wash.

[73] Assignee: The Boeing Company, Seattle, Wash.

[21] Appl. No.: 102,484

[22] Filed: Sep. 29, 1987

[51] Int. Cl.⁴ .................. G06F 15/46; B21D 7/14
[52] U.S. Cl. .................. 364/476; 364/167.01; 72/389; 72/702
[58] Field of Search .................. 364/474, 476, 167; 72/8, 389, 457, 702

[56] References Cited

U.S. PATENT DOCUMENTS

| | | | |
|---|---|---|---|
| 3,821,525 | 6/1974 | Eaton et al. | 72/702 |
| 4,408,471 | 10/1983 | Gossard et al. | 364/476 |
| 4,486,841 | 12/1984 | Koyama et al. | 364/476 |
| 4,488,237 | 12/1984 | Aronson et al. | 364/476 |
| 4,511,976 | 4/1985 | Graf | 364/476 |
| 4,640,113 | 2/1987 | Dieperink et al. | 72/389 |
| 4,656,862 | 4/1987 | Kogure et al. | 72/389 |

*Primary Examiner*—Jerry Smith
*Assistant Examiner*—Paul Gordon

*Attorney, Agent, or Firm*—Finnegan, Henderson, Farabow, Garrett & Dunner

[57] ABSTRACT

A method and related system for operating a computer controlled press brake system to form a requested bend angle in a workpiece are described. According to the disclosed method, values corresponding to geometrical characteristics of the press brake and a first workpiece are stored, as is a value for the requested bend angle. A ram of the press is operated in a first direction, relative to the die, to a first selected position to bend the first workpiece and to hold the first workpiece to a restrained bend angle. The ram is thereafter operated in a second direction to release the first workpiece to an unrestrained bend angle. The difference between the restrained and unrestrained bend angles of the first workpiece is calculated. Using the values for geometrical characteristics and the requested bend angle, a correction factor is calculated. In accordance with the correction factor, the unrestrained and requested bend angles, the ram is set to travel to a corrected position. The ram is operated to the corrected position to bend a second workpiece, substantially identical to the first workpiece, to bend the second workpiece to the requested angle.

8 Claims, 3 Drawing Sheets

METHOD AND RELATED APPARATUS FOR CONTROLLING THE OPERATION OF A PRESS BRAKE

BACKGROUND OF THE INVENTION

I. Field of the Invention

This invention relates generally to a method and related apparatus for controlling the operation of a press brake system for bending a bar, tube, sheet or other workpiece to a required angle during a metal forming process.

II. Background Information

Operation of a press brake system to bend a sheet or workpiece, such as a press brake, to a requested bend angle typically includes a series of manual press setup steps. The steps involved in press setup include the step of placing a first workpiece over a die of the press in a manner such that, when the ram of the press is operated, being brought into contact with the first workpiece, the workpiece is bent to a first bend angle. The first bend angle to which the workpiece is bent is a function of various parameters including the position in the die to which the ram travels when brought into contact with the first workpiece.

Accordingly, press setup also includes the step of selecting and setting the position, into the die, to which the ram of the press travels when operated, this position setting being performed in an effort to obtain a first bend angle equal in size to the requested bend angle.

After the above-mentioned steps have been performed, press setup continues with the step of operating the ram to travel to the selected position to bend the first workpiece. The first workpiece having been bent, the size of the first bend angle is then measured. The difference between the measured first bend angle and the requested bend angle is obtained.

In accordance with the difference between the first and the requested bend angles, a next travel position for the ram is selected and the travel position for the ram is reset. The travel position is reset in an effort to control the bend angle of a second workpiece to more nearly approach the requested bend angle. Thereafter, the setup process continues with the steps of placing the second workpiece over the die and operating the ram to travel to the next selected position to bend the second workpiece. The size of the second bend angle is then measured and compared with the requested bend angle.

In accordance with the difference between the second and the requested bend angles, selection and manual resetting of the travel position of the ram is again performed. The travel position is reset to another next selected position for achieving the requested bend angle using a third workpiece.

In the iterative manner described above, third and successive workpieces are bent by the press until the ram of the press is operated from a correct selected position to achieve a bend angle for a successive workpiece which is equivalent to the requested bend angle. Once this equivalence has been achieved, press setup is complete, and a batch of identical workpieces to be bent to the same requested bend angle are bent by operating the ram to the corrected position. The above-described setup steps are repeated whenever, due to any changes in press brake performance, the batch of identical sheets are no longer being bent to the requested angle. In such an event, each of the manual setup steps described is again performed.

Performing the above-described bending and measuring, and manual setting and resetting steps requires significant amounts of time, causes the press setup to be slow and thereby generally slows the process of bending workpieces. Accordingly, several approaches have been tried to automatically control the operation of a brake press to increase the rate at which workpieces may be bent to a requested bend angle.

One proposed approach for controlling press operation which has been experimented with is the approach referred to as "adaptive bending." According to the adaptive bending approach, a ram is equipped with sensors for measuring air pressure between the ram and the workpiece being bent. In accordance with the air pressure and certain information regarding air pressure and bend angle relationships, control apparatus, connected to the ram, die and other press apparatus, sets the travel position of the ram. The adaptive bending approach, and the air pressure information used in adaptive bending, have yielded marginally accurate controlled bending results.

Another proposed approach utilizes a control apparatus of a press including a folding die and an articulating die base. The fold of the die and the position of the base are automatically controlled to achieve a requested bend angle. This system, however, lacks the level of sensitivity desired.

Yet another proposed approach for controlling operation of the press is the "force/displacement" approach. A force/displacement control system operates to set the ram travel position according to the predicted force exerted by the ram when the ram, traveling to a selected position, is brought in contact with a workpiece of a given size and having specific physical properties. Accurate adjustments are performed by this control system only within a limited force range and with specific materials.

SUMMARY OF THE INVENTION

Accordingly, it is an object of the present invention to provide a method and related apparatus for operating a computer controlled brake press system to form a requested bend angle in a workpiece, the system obviating the need for slow, manual press setup.

It is also an object of the invention to provide a method and related apparatus which accurately sets the travel position of the ram without the need for measuring the amount of air pressure or force between the ram and a workpiece to be bent.

Additional objects and advantages of the invention will be set forth in part in the description which follows, and in part will be obvious from the description, or may be learned by practice of the invention. The objects and advantages of the invention will be realized and attained by means of the instrumentalities and combinations particularly pointed out in the appended claims.

To achieve the objects and in accordance with the purpose of the invention, an embodied and broadly described herein, there is provided a method of operating a computer controlled press brake system having a ram for bending a workpiece in a die, for forming a requested bend angle in the workpiece, said method comprising the steps of: storing selected values corresponding to geometrical characteristics of the press brake system and a first workpiece, having geometrical and specific bending characteristics; storing a value corresponding to the requested bend angle; operating the ram in a first direction to a first selected position relative to the die, the ram being in restrained contact with the first workpiece when in the first selected position, to bend the first workpiece to a restrained bend angle; operating the ram in a second direction to release the first workpiece to an unrestrained bend angle; calculating the angle difference between the restrained and unrestrained bend angles of the first workpiece; calculating a correction factor in accordance with the requested bend angle and the stored selected values; setting the ram to travel in the first direction to a corrected position in accordance with the unrestrained bend angle, requested bend angle, and the calculated correction factor, when the ram is operated; and operating the ram to the corrected position for bending a second workpiece, having geometrical and specific bending characteristics corresponding to the first workpiece, to the requested bend angle.

Related apparatus is also provided. The apparatus, that is, the computer controlled press brake system for bending a workpiece, having specific bending characteristics, to a requested bend angle comprises: a die for holding a workpiece to be bent; a ram for bending a workpiece; operating means for operating the ram in a first direction to a first selected position relative to the die to bend a first workpiece, having geometrical and specific bending characteristics, to a restrained bend angle, the ram being in restrained contact with the first workpiece when in the first selected position, and for operating the ram in a second direction to release the first workpiece to an unrestrained bend angle; first input means for receiving and storing selected values corresponding to geometrical characteristics of the press brake and first workpiece; second input means for receiving and storing a value corresponding to the requested bend angle; calculating means responsive to said first and second input means for calculating the angle difference between the restrained and unrestrained bend angles of the first workpiece, and for calculating a correction factor in accordance with the requested bend angle and the stored selected values; and position setting means responsive to said calculating means and operatively connected to said operating means for setting said ram to travel in the first direction to a corrected position in accordance with the unrestrained bend angle, the stored requested bend angle, and the correction factor, the ram thereafter being operated to the corrected position to bend a second workpiece, having said specific bending characteristics corresponding to the first workpiece, to the requested bend angle.

The accompanying drawings which are incorporated in and constitute part of this specification, illustrate one embodiment of the invention and, together with the description, serve to explain the principles of the invention.

DESCRIPTION OF PREFERRED EMBODIMENT

Referring to the accompanying drawings, a method for operating a computer controlled press brake system incorporating the teachings of the subject invention for forming a requested bend angle in a workpiece is described. In connection with the description, apparatus for carrying out the method is also described.

Figure 1:
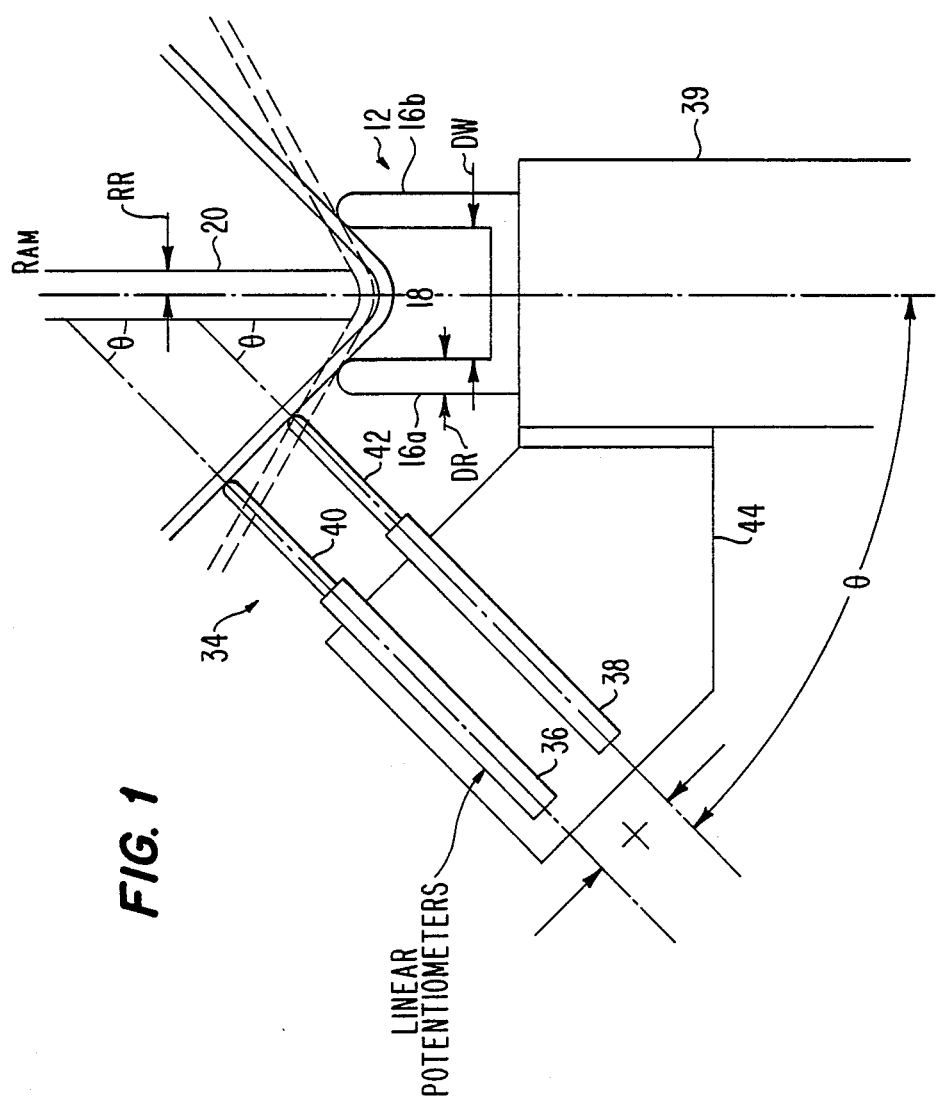
FIG. 1 is a cross-sectional diagram of the ram, die and bend sensor assembly of a press brake system incorporating the teachings of the present invention.

The computer controlled press brake operated according to the method of the subject invention includes a die 12 for holding a workpiece. As shown in FIG. 1, the die 12 includes a pair of upstanding arms 16a and 16b for holding a first workpiece 14. Upstanding arms 16a and 16b define an internal space 18 of the die, having a width DW. Arms 16a and 16b each have a width or radius DR. First workpiece 14, which possesses specific bending characteristics which are features of at least the type of material comprising workpiece 14 has a workpiece thickness t. The press brake also includes a punch or ram 20, having a radius RR.

Figure 2:
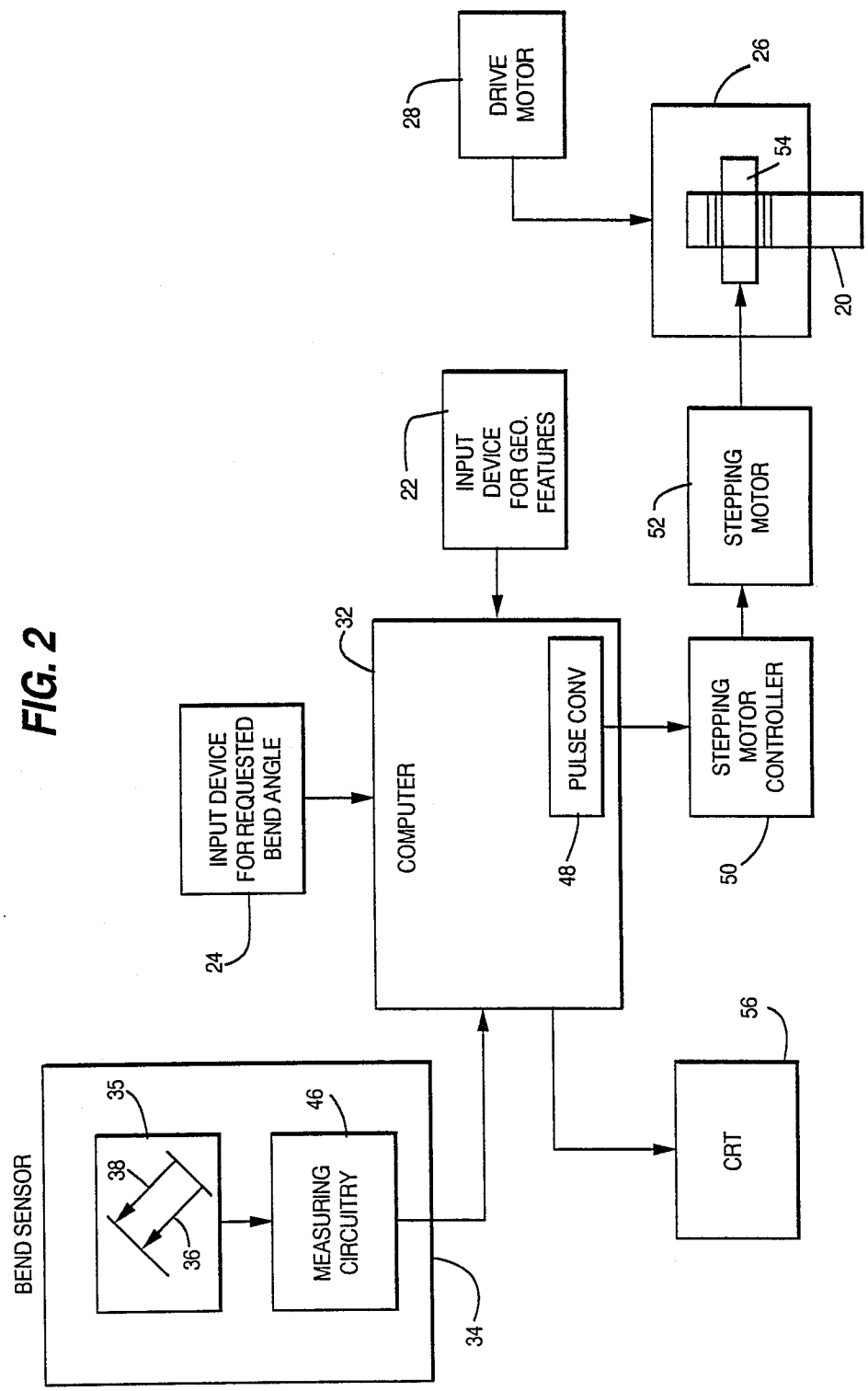
FIG. 2 is a block diagram of the system of the present invention including input and control devices.

The press brake system, as shown in FIG. 2, further includes a first input means for receiving and storing selected values corresponding to at least the above-described geometrical features of die 12, ram 20 and workpiece 14. As here embodied, the first input means comprises an input device 22 into which an operator may enter information regarding the geometrical features for storage and later use. A second input means is also provided. As here embodied, the second input means comprises an input device 24 for receiving and storing selected values corresponding to the requested bend angle for a workpiece. Input device 22 and 24 may be part of a single input unit having apparatus adapted to receive and store information from a user, such as, for example a model VT-220 input/output terminal from Digital Equipment Corporation of Maynard, Mass.

Accordingly, utilizing the above-described apparatus, the method of the present invention here described includes a step 100 of storing selected values corresponding to geometrical characteristics of the press brake and a first workpiece. This step is shown in the flow diagram of FIG. 3. The characteristics which are stored during this step are discussed in detail in connection with a later step in the method. The method also includes a step 102 of storing a value corresponding to the requested bend angle.

Referring again to FIG. 2, the press brake also includes operating means for operating the ram to put the ram in restrained contact with first workpiece 14 at an area of workpiece 14 equidistant from arms 16a and 16b, and for operating the ram to release the ram from restrained contact with first workpiece 14. As here embodied, the operating means comprises a platten 26 and a drive motor or hydraulic device 28. Platten 26 is operatively connected to ram 20 for moving ram 20 in a first direction to a first selected position to be in restrained contact with first workpiece 14, thereby bending workpiece 14 to a restrained bend angle. Platten 26 also operates to move ram 20 in a second direction to release ram 20 from restrained contact with first workpiece 14, first workpiece 14 being released to an unrestrained bend angle. The operating means also includes a drive motor 28 to which platten 26 is also operatively connected. Drive motor 28 moves platten 26 in the first and second directions in order to move ram 20 to and from the first selected position. Drive motor 28 may be any drive motor adapted to move platten 26 as described, and platten 26 may be any mechanism suitable to move ram 20 the appropriate amount within internal space 18 of die 12 to bend a workpiece in the desired manner, and suitable to permit setting of ram 20 to travel to a corrected position as described further below.

Figure 3:
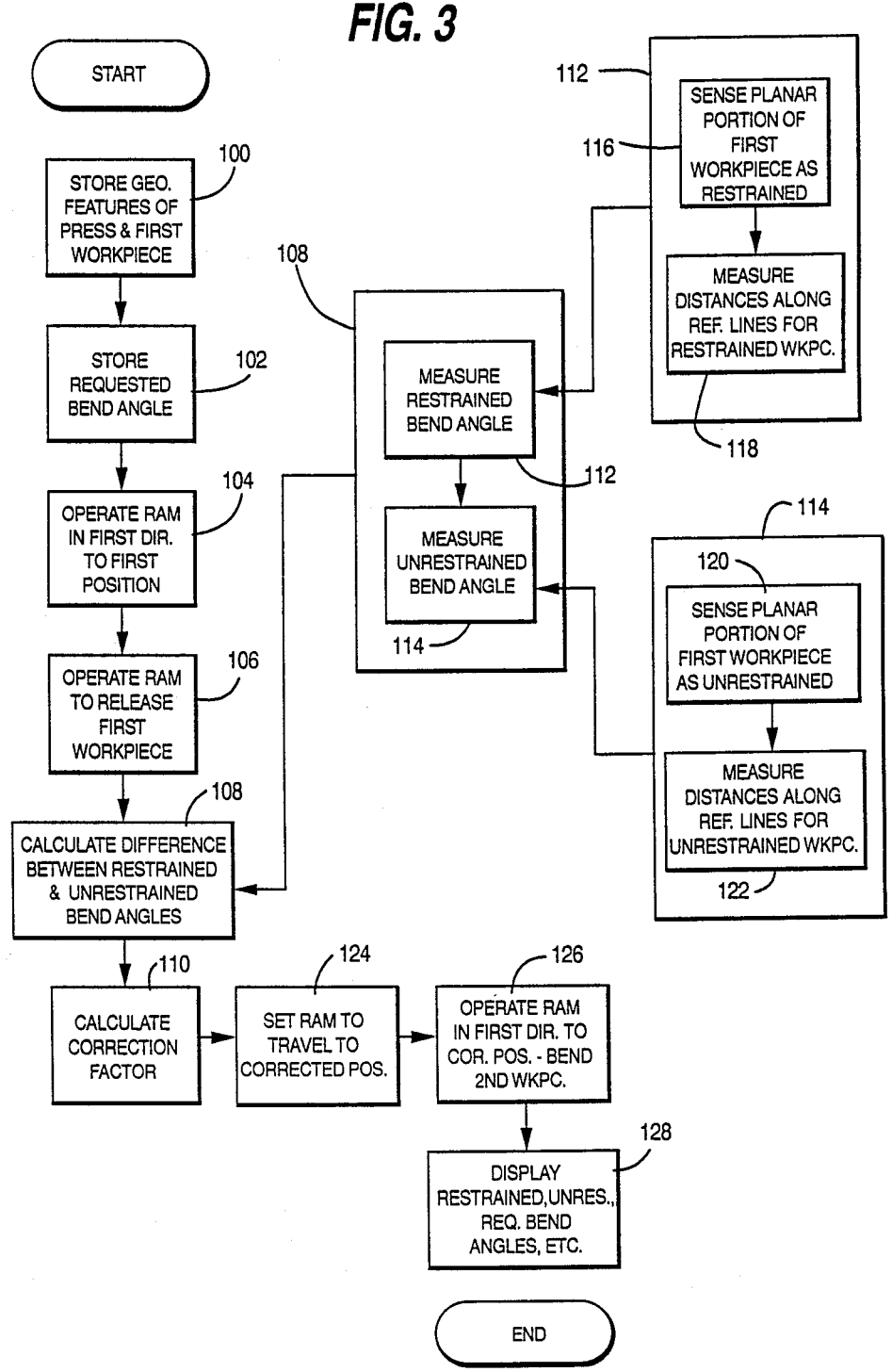
FIG. 3 is a flow diagram illustrating a method incorporating the teachings of the present invention.

Accordingly, the method of the present invention illustrated in FIG. 3, also includes ram operation steps 104 and 106. In step 104, ram 20 is operated in a first direction to a first selected position relative to the die. The first selected position may be any position which when vertically approached by ram 20 brings the ram into contact with first workpiece 14 and which bends workpiece 14 as generally shown in FIG. 1. In step 106, ram 20 is operated in a second direction, opposite to the first direction, to release first workpiece 14 from being in restrained contact with ram 20. First workpiece 14 is released to an unrestrained bend angle.

The system of the present invention also includes calculating means responsive to first input means 22 and second input means 24 for calculating the angle difference between the unrestrained and restrained bend angles of first workpiece 14 and for calculating a correction factor in accordance with the requested bend angle and the values corresponding to the geometrical characteristics.

As embodied herein, the calculating means comprises a computer 32 (see FIG. 2) having input and output capability for receiving data from first input means 22 and second input means 24, and a microprocessor for performing calculations based on received data. The microprocessor performs the calculations in the manner described below and may be, for example, a model PDP11/23 microprocessor available from Digital Electronics Corporation of Maynard, Mass.

Utilizing the above-described apparatus, further steps of the method of the present invention are performed. That is, in addition to storing geometrical and requested bend angle values, and operating the ram in first and second directions, the method of the present invention further includes calculating steps 108 and 110.

In step 108, the angle difference between the above-mentioned restrained and unrestrained bend angles for first workpiece 14 are calculated. Preferably, as shown in FIG. 3, step 108 is performed by actually measuring the restrained and unrestrained bend angles obtained when ram 20 is operated to contact and then release first workpiece 14. (See substeps 112 and 114 described below.)

The angle difference is representative of the springback undergone by first workpiece 14 when bent by ram 20. When ram 20 is operated to the first selected position, the ram is axially extended into area 18 of die 12. At the maximally extended position, first workpiece 14 is restrained, as mentioned, and maximally bent to the restrained bend angle. Thereafter, workpiece 14 is released as ram 20 is operated back from within area 18 of die 12. As first workpiece 14 is released, it "springs back" to an unrestrained bend angle. The springback experienced by first workpiece 14 is a function of the specific bending characteristics of workpiece 14, which are, in turn, a function of the properties of the workpiece material and its specific dimensions. For identical workpieces, the springback experienced will be essentially equivalent. Knowledge of the springback undergone by a workpiece when the ram is operated to the first selected position is necessary in determining a corrected position to which the ram should be operated to achieve the requested bend angle, as described later.

In substep 112, the restrained bend angle of first workpiece 14 is measured. The measurement is obtained when the ram is in the first selected position using a measuring means to which the calculating means, in the form of computer 32, is responsive. A measuring means for use in connection with this method is described below.

In substep 114, the unrestrained bend angle of first workpiece 14 is measured. The measurement for the unrestrained bend angle is obtained when first workpiece 14 has been released to the unrestrained bend angle, also using the measuring means.

While any suitable means operative to measure the restrained and unrestrained bend angles and to output representative information to computing means 32 may be utilized, as here embodied, the measuring means comprises a bend sensor unit 34 as shown generally in FIG. 2 and as depicted in greater detail in FIG. 1.

Bend sensor 34 includes sensing means 35 for sensing a planar portion of a workpiece in die 12, the planar portion being spaced away from die 12. As here embodied, the sensing means comprises linear potentiometers 36 and 38 having probe shafts 40 and 42, respectively.

Linear potentiometers 36 and 38 are preferably held in fixed relation to die 12 by a support structure 44 which is mounted to another, lower platten 39 of the press. Probe shafts 40 and 42 are movable for contacting the planar portion of a workpiece. Support structure 44 maintains potentiometers 36 and 38 parallel to each other and at a predetermined angle with respect to the first direction of travel of ram 20. According to a presently constructed device, angle $\theta$ is approximately 40 degrees. An imaginary plane defined by potentiometers 36 and 38 includes reference lines extending from a common datum line for the potentiometers, through potentiometers 36 and 38 to the planar portion of a workpiece.

As a workpiece, such as first workpiece 14 bends, first to a restrained bend angle, then to an unrestrained bend angle, probe shafts 40 and 42 move to contact the planar portion of the workpiece, the length of the reference line for each potentiometer probe shaft varying in accordance with the bend of the workpiece planar portion. Probe shafts 40 and 42 are spaced apart by a distance X such that a measurable difference exists between the length of the corresponding reference lines for acute bend angles. For a presently constructed device, potentiometers 36 and 38 and their respective probe shafts are spread apart by a distance of approximately 1.40 inches. As probe shafts 40 and 42 move to contact the workpiece, potentiometers 36 and 38 undergo a change in resistance.

Bend sensor 34 further includes means responsive to the linear potentiometers 36 and 38 and respective probe shafts 40 and 42, of the sensing means, for measuring distances along the reference lines between the common datum line and the planar portion of a workpiece. As here embodied, the measuring means comprises electrical circuitry 46, connected to a power source (not shown) and no linear potentiometers 36 and 38. Electrical circuitry 46 has voltage output terminals, for outputting voltage signals corresponding to the resistance in each of potentiometers 36 and 38. Electrical circuitry 46 is operatively connected to computer 32 to provide the corresponding voltages for potentiometers 36 and 38. Voltages corresponding to each of potentiometers 36 and 38 may be averaged from circuitry 46 to obtain averaged spike-free voltages. A present version of the disclosed system operates to sample potentiometer voltages as often as 1200 times in 0.2 seconds to obtain averaged voltages.

Based on the difference in resistance for potentiometers 36 and 38, as indicated by their respective voltages (or averaged voltages), and the corresponding difference in length for the reference lines, restrained and unrestrained bend angles for a workpiece are obtained using computer 32. Computer 32 is responsive to the voltages across the voltage terminals of circuitry 46 to obtain the bend angles for the workpiece based on the distance X between linear potentiometers 40 and 42 the angle $\theta$, and generally known trigonometric relationships. Where the corresponding voltage and thus length of the reference lines obtained for a potentiometer have been adversely affected, that is, lessened by any pressure of probe shaft 40 or 42 on the planar portion of workpiece 14, as is sometimes the case, computer 32, utilizing a bending beam formula, compensates for this adverse affect. The bending beam formula is a function of the position of the probe relative to the press, the material and moment of inertia of the workpiece, and the pressure exerted by the probe shafts.

Utilizing the above-described bend sensor, the sub-steps of measuring restrained and unrestrained bend angles of first workpiece 14 (substeps 112 and 114) are each specifically performed by performing sensing and measuring sub-substeps. In a sub-substep 116, a planar portion of first workpiece 14 is sensed with workpiece 14 being in a restrained position. The restrained bend angle for workpiece 14 is measured as a function of the distance between a predetermined common datum line and the planar portion of workpiece 14 along reference lines, in a sub-substep 118.

Similarly, in a sub-substep 120, a planar portion of first workpiece 14 is sensed with workpiece 14 being in an unrestrained position. The unrestrained bend angle for workpiece 14 is measured as a function of the distance between a predetermined common datum line and the planar portion of workpiece 14, in a step 122.

In calculation step 110, a correction factor is obtained in accordance with the requested bend angle and the values corresponding to geometrical characteristics of the press brake system. Specifically, a correction factor CF, is obtained which is a ratio of the distance of travel from ram 20 per degree of change in bend angle. That is, correction factor CF represents how much change in ram travel position achieves one degree change in bend angle. This factor varies for given bend angles, the amount of change in ram travel position required to bend a workpiece to a given angle being greater for larger bend angles. Accordingly, correction factor CF is given in units of distance per degree as are displacements $Y_1$, and $Y_2$ which define correction factor CF in the manner set forth in the following equation:

$$CF = Y_2 + Y_1$$

Values for $Y_1$, and $Y_2$ are preferably obtained using the geometrical characteristics input in step 100 of the described method. Where, as stated above, DW represents the width of die 12, DR the radius of upstanding arms 16a and 16b of die 12, RR the radius of ram 20, and t the thickness of first workpiece 14, and where BA is a representation for one half the requested bend angle, the value Y ($Y_1$ or $Y_2$) is defined by and calculated using the following equation:

$$Y = \frac{(\frac{1}{2}DW) - (DR\operatorname{Tan}(\frac{1}{2})(BA))}{\operatorname{Tan}(90° - BA)} + RR + t - \frac{(RR + t)}{\operatorname{Sin}(90° - BA)} \tag{2}$$

In actuality, bend angle BA changes for the two equations. The equation for $Y_1$ uses the requested bend angle actually sought for the press brake.

The equation uses one degree more than the requested bend angle for calculating $Y_2$. Accordingly, the change in displacement for ram 20 for changing bend angles near the requested bend angle can be obtained.

After correction factor CF has been calculated, ram 20 is set to travel in the first direction to a corrected position in accordance with the stored requested bend angle (BA), the unrestrained bend angle and correction factor CF (step 124, FIG. 3). Where the unrestrained bend angle is represented by UA and a change in travel position TP from the first selected position to a corrected position CP, a value for change TP is given by the following equation.

$$TP = CF(BA - UA) \times \left[ 1 + \frac{BA - UA}{BA} \right] \tag{3}$$

The difference (BA-UA) between the requested and unrestrained bend angles is given in angle units such as degrees, and accordingly change TP is a linear distance value.

The press brake system of the present invention includes position setting means, operatively connected to computer 32 for setting ram 20 to travel in the first direction to corrected position CP. As here embodied, the position setting means comprises a pulse converter 48 for converting change TP, as calculated, into pulses for use by a stepping motor controller 50 in adjusting a stepping motor 52 to set ram 20 to be operated to corrected position CP.

Controller 50 provides electric control signals of a given polarity and for a predetermined length of time to turn stepping motor 52 to set the position of ram 20 relative to platten 26. Stepping motor 52 may be any stepping motor adapted to function as described, and controller 50 may be any stepping motor controller capable of turning motor 52 the appropriate incremental amount to set ram 20 to bend a workpiece in the desired manner.

As here embodied, the operating means may also include an adjustment mechanism 54 for specifically adjusting the position of ram 20 relative to platten 26 in accordance with incremental steps of motor 52.

In step 126, ram 20 is operated to corrected position CP to bend a second workpiece inserted in die 12 for first workpiece 14. The second workpiece has specific bend characteristics corresponding to first workpiece 14. That is the workpieces are substantially identical as to physical properties and size.

The disclosed press brake system also includes a display means for displaying, for example, requested bend angle BA, unrestrained bend angle UA, the restrained bend angle, and the angle difference between the restrained and unrestrained bend angles. As here embodied, the display means may be any CRT display 56 operative to receive data from computer 32 and to display described information from the received data.

In a step 128, the restrained, unrestrained and requested bend angles and the angle difference between the restrained and unrestrained angles are displayed. As can be seen, all the foregoing steps are not necessarily performed in the order in which the steps are described. For example, information regarding bend angles may be displayed at almost any time.

Other embodiments of the system and method of the invention will be apparent to those skilled in the art from a consideration of the specification and practice of the invention disclosed herein. Thus, it is intended that the specification and drawing be considered as exemplary only, with a true scope and spirit of the invention being indicated by the following claims and their equivalents.

We claim:

1. A method of setting up a computer controlled press brake for forming a requested bend angle in a workpiece, the press brake having a ram for bending the workpiece and a die having a pair of upstanding arms for holding the workpiece, said method comprising the steps of
   storing selected values corresponding to geometrical characteristics of the press brake and the workpiece, having geometrical and specific bending characteristics;
   storing a value corresponding to the requested bend angle;
   operating the ram in a first direction to a first selected position relative to the die, the ram being in restrained contact with a test workpiece when in the first selected position, to bend the test workpiece to a restrained bend angle the same as the requested bend angle;
   operating the ram in a second direction to release the test workpiece to an unrestrained bend angle;
   calculating the angle difference between the restrained and unrestrained bend angles of the test workpiece;
   calculating a correction factor in accordance with the requested bend angle and the stored selected values; and
   setting the ram to travel in the first direction to a corrected position in accordance with the restrained bend angle, the stored requested bend angle, and the calculated correction factor, when the ram is operated.

2. The method of setting up a computer controlled press brake of claim 1, wherein the step of calculating the angle difference of the restrained and unrestrained bend angles of the test workpiece, comprises the substeps of:
   measuring the restrained angle of the test workpiece at a time when the ram is in the first selected position;
   measuring the unrestrained bend angle of the test workpiece at a time when the ram releases the test workpiece to the unrestrained bend angle; and
   calculating the difference between the measured restrained and unrestrained bend angles.

3. A computer controlled press brake system for bending a workpiece, having specific bending characteristics, to a requested bend angle, comprising:
   a die having a pair of upstanding arms for holding a workpiece to be bent;
   a ram for bending the workpiece;
   operating means for operating the ram in a first direction to a first selected position relative to the die to bend a test workpiece, having geometrical and specific bending characteristics, to a restrained bend angle the same as the requested bend angle, the ram being in restrained contact with the test workpiece when in the first selected position, and for operating the ram in a second direction to release the test workpiece to an unrestrained bend angle;
   first input means for receiving and storing selected values corresponding to geometrical characteristics of the press brake and the test workpiece;
   second input means for receiving and storing a value corresponding to the requested bend angle;
   calculating means responsive to said first and second input means for calculating the angle difference between the restrained and unrestrained bend angles of the test workpiece, and for calculating a correction factor in accordance with the requested bend angle and the stored selected values; and
   position setting means responsive to said calculating means and operatively connected to said operating means for setting said ram to travel in the first direction to a corrected position in accordance with the unrestrained bend angle, the stored requested bend angle, and the correction factor, the ram thereafter being operated to the corrected position to bend a workpiece having said specific bending characteristics corresponding to the test workpiece to the requested bend angle.

4. The computer controlled press brake system of claim 3, wherein the system further comprises:
   measuring means for measuring the restrained bend angle of the test workpiece at a time when the ram is in the test selected position, and for measuring the unrestrained bend angle of the test workpiece at a time when the ram releases the test workpiece to the unrestrained bend angle;
   said calculating means being responsive to said measuring means for calculating the difference between the measured restrained and unrestrained bend angles.

5. The computer controlled press brake system of claim 3, wherein the system further comprises:
   display means for displaying the requested bend angle, the restrained and unrestrained bend angles, and the angle difference between the restrained and unrestrained bend angles.

6. A method of setting up a computer controlled press brake having a ram for bending a workpiece in a die, for forming a requested bend angle in the workpiece, said method comprising the steps of
   storing selected values corresponding to geometrical characteristics of the press brake and the workpiece, having geometrical and specific bending characteristics;
   storing a value corresponding to the requested bend angle;
   operating the ram in a first direction to a first selected position relative to the die, the ram being in restrained contact with a test workpiece when in the first selected position, to bend the test workpiece to a restrained bend angle;
   measuring the restrained angle of the test workpiece at a time when the ram is in the first selected position;
   operating the ram in a second direction to release the test workpiece to an unrestrained bend angle;

measuring the unrestrained bend angle of the test workpiece at a time when the ram releases the test workpiece to the unrestrained bend angle;

calculating the angle difference between the restrained and unrestrained bend angles of the test workpiece;

calculating a correction factor in accordance with the requested bend angle and the stored selected values; and setting the ram to travel in the first direction to a corrected position in accordance with the restrained bend angle, the stored requested bend angle, and the calculated correction factor, when the ram is operated;

wherein the steps of measuring the restrained and unrestrained bend angles each comprise the substeps of:

establishing spaced parallel reference lines extending in an imaginary plane inclined at a predetermined angle to at least the first direction of ram operation, sensing a planar portion of the test workpiece spaced from the die, and measuring the bend angles as a function of the distance between a predetermined common datum line and the planar portion of the test workpiece along the parallel reference lines.

7. The method of setting up a computer controlled press brake of claim 6, wherein the method further includes the step of displaying the requested bend angle, the restrained and unrestrained bend angles, and the angle difference between the restrained and unrestrained bend angles.

8. A computer controlled press brake system for bending a workpiece, having specific bending characteristics, to a requested bend angle, comprising:

a die for holding a workpiece to be bent;

a ram for bending a workpiece;

operating means for operating the ram in a first direction to a first selected position relative to the die to bend a test workpiece having geometrical and specific bending characteristics to a restrained bend angle, the ram being in restrained contact with the test workpiece when in the first selected position, and for operating the ram in a second direction to release the test workpiece to an unrestrained bend angle;

first input means for receiving and storing selected values corresponding to geometrical characteristics of the press brake and the test workpiece;

second input means for receiving and storing a value corresponding to the requested bend angle;

measuring means for measuring the restrained bend angle of the test workpiece at a time when the ram is in the first selected position, and for measuring the unrestrained bend angle of the test workpiece at a time when the ram releases the test workpiece to the unrestrained bend angle, said measuring means comprising:

sensing means for sensing a planar portion of the test workpiece, the planar portion being spaced from the die, and means, responsive to said sensing means, for measuring distances along two spaced reference lines extending in an imaginary plane inclined at a predetermined angle to at least the first direction of ram operation between a predetermined common datus line and the planar portion of the test workpiece to obtain the restrained and unrestrained bend angles;

calculating means responsive to said first and second input means and said measuring means for calculating the angle difference between the restrained and unrestrained bend angles of the test workpiece, and for calculating a correction factor in accordance with the requested bend angle and the stored selected values; and position setting means responsive to said calculating means and operatively connected to said operating means for setting said ram to travel in the first direction to a corrected position in accordance with the unrestrained bend angle, the stored requested bend angle, and the correction factor, the ram thereafter being operated to the corrected position to bend a workpiece having said specific bending characteristics corresponding to the test workpiece, to the requested bend angle.

* * * * *